United States Patent
Li

(10) Patent No.: US 12,041,358 B2
(45) Date of Patent: Jul. 16, 2024

(54) HIGH DYNAMIC RANGE IMAGE SYNTHESIS METHOD AND APPARATUS, IMAGE PROCESSING CHIP AND AERIAL CAMERA

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 99 days.

(21) Appl. No.: 17/938,517

(22) Filed: Oct. 6, 2022

(65) Prior Publication Data
US 2023/0038844 A1 Feb. 9, 2023

Related U.S. Application Data

(63) Continuation of application No. PCT/CN2021/083350, filed on Mar. 26, 2021.

(30) Foreign Application Priority Data

Apr. 14, 2020 (CN) .......................... 202010291571.0

(51) Int. Cl.
*G06T 7/20* (2017.01)
*G06T 5/50* (2006.01)
(Continued)

(52) U.S. Cl.
CPC ............. *H04N 23/741* (2023.01); *G06T 5/50* (2013.01); *G06T 5/90* (2024.01); *G06T 7/20* (2013.01);
(Continued)

(58) Field of Classification Search
CPC ...... H04N 23/741; H04N 23/71; H04N 25/53; H04N 25/703; G06T 5/90; G06T 5/50;
(Continued)

(56) References Cited

U.S. PATENT DOCUMENTS 7,382,931 B2 * 6/2008 Kang ........................ G06T 5/50
382/284
9,307,212 B2 * 4/2016 Vranceanu ................ G06T 5/50
(Continued)

FOREIGN PATENT DOCUMENTS

CN 101262564 A 9/2008
CN 103973989 A 8/2014
(Continued)

OTHER PUBLICATIONS

The International Search Report mailed Jun. 15, 2021; PCT/CN2021/083350.

*Primary Examiner* — Brian P Yenke
(74) *Attorney, Agent, or Firm* — Frank Gao, Esq.

(57) ABSTRACT

Embodiments of the present invention are a high dynamic range (HDR) synthesis method and apparatus, an image processing chip and an aerial camera. The method includes: acquiring a plurality of to-be-synthesized images having different exposure time; calculating a mean brightness of the to-be-synthesized images; determining an image brightness type of the to-be-synthesized images according to the mean brightness; calculating a brightness difference between adjacent pixel points in one to-be-synthesized image; calculating an inter-frame difference of different to-be-synthesized images at a same pixel point position according to the brightness difference; determining a motion state of the to-be-synthesized images at the pixel point position according to the inter-frame difference; and weighting and synthesizing the to-be-synthesized images into a corresponding HDR image according to the image brightness type and the motion state.

20 Claims, 4 Drawing Sheets

(51) Int. Cl.
  *G06T 5/90* (2024.01)
  *H04N 23/71* (2023.01)
  *H04N 23/741* (2023.01)

(52) U.S. Cl.
  CPC ... *H04N 23/71* (2023.01); *G06T 2207/10032* (2013.01); *G06T 2207/10144* (2013.01); *G06T 2207/10152* (2013.01); *G06T 2207/20208* (2013.01); *G06T 2207/20212* (2013.01)

(58) Field of Classification Search
  CPC ............ G06T 7/20; G06T 2207/10032; G06T 2207/10144; G06T 2207/10152; G06T 2207/20208; G06T 2207/20212
  See application file for complete search history.

(56) References Cited

U.S. PATENT DOCUMENTS

| | | | |
|---|---|---|---|
| 9,437,171 B2* | 9/2016 | Narasimha | H04N 23/741 |
| 10,165,194 B1* | 12/2018 | Baldwin | G06T 5/94 |
| 10,264,193 B2* | 4/2019 | Schaefer | G06T 5/94 |
| 10,616,499 B2* | 4/2020 | Yang | H04N 23/54 |
| 10,638,052 B2* | 4/2020 | Dhiman | H04N 23/80 |
| 10,701,279 B2* | 6/2020 | Hsieh | H04N 23/743 |
| 10,742,892 B1* | 8/2020 | Le | H04N 23/741 |
| 10,750,098 B2* | 8/2020 | Fujinami | H04N 25/583 |
| 10,757,344 B2* | 8/2020 | Shimizu | G06T 5/50 |
| 10,916,036 B2* | 2/2021 | Nikkanen | H04N 25/589 |
| 10,944,914 B1* | 3/2021 | Le | G06T 5/60 |
| 11,017,509 B2* | 5/2021 | Bouzaraa | G06T 5/10 |
| 11,095,829 B2* | 8/2021 | Zhen | H04N 23/6812 |
| 11,113,802 B1* | 9/2021 | Sun | H04N 23/743 |
| 11,128,809 B2* | 9/2021 | Zhen | G06T 7/20 |
| 11,190,707 B2* | 11/2021 | Xie | H04N 23/741 |
| 11,276,154 B2* | 3/2022 | Roy | H04N 23/76 |
| 11,356,604 B2* | 6/2022 | Woodall | H04N 7/0127 |
| 11,363,213 B1* | 6/2022 | Song | G06T 7/20 |
| 11,373,281 B1* | 6/2022 | Ravirala | G06T 7/215 |
| 11,379,997 B2* | 7/2022 | Lee | G06T 5/77 |
| 11,457,157 B2* | 9/2022 | Douady | H04N 23/6845 |
| 11,539,895 B1* | 12/2022 | Seets | H04N 23/6811 |
| 11,570,374 B1* | 1/2023 | Sun | G06T 5/50 |
| 11,653,088 B2* | 5/2023 | Douady | H04N 19/46 |
| | | | 348/221.1 |
| 11,671,714 B1* | 6/2023 | Xiao | H04N 25/535 |
| | | | 348/362 |
| 11,710,223 B2* | 7/2023 | Woodall | H04N 23/681 |
| | | | 382/107 |
| 11,825,207 B1* | 11/2023 | Ravirala | G06T 5/92 |
| 11,863,880 B2* | 1/2024 | Sokeila | H04N 23/741 |
| 2006/0177150 A1 | 8/2006 | Uyttendaele et al. | |
| 2010/0328482 A1* | 12/2010 | Chang | G06T 5/50 |
| | | | 348/222.1 |
| 2013/0136364 A1 | 5/2013 | Kobayashi | |
| 2015/0116525 A1* | 4/2015 | Peng | G06T 5/50 |
| | | | 348/218.1 |
| 2015/0348242 A1* | 12/2015 | Molgaard | G06T 5/73 |
| | | | 348/241 |
| 2020/0211166 A1* | 7/2020 | Yao | G06T 3/18 |
| 2020/0236273 A1* | 7/2020 | Kang | H04N 25/583 |
| 2021/0278836 A1* | 9/2021 | Li | B64C 39/024 |
| 2021/0377457 A1* | 12/2021 | Kobayashi | G06T 5/77 |
| 2021/0400172 A1* | 12/2021 | Li | G06T 5/70 |
| 2022/0043117 A1* | 2/2022 | Akselrod | G02F 1/292 |
| 2022/0138964 A1* | 5/2022 | Gintsburg | H04N 23/743 |
| | | | 382/103 |
| 2022/0198625 A1* | 6/2022 | McElvain | G06T 5/70 |
| 2022/0230283 A1* | 7/2022 | Wang | H04N 23/743 |
| 2022/0236056 A1* | 7/2022 | Jiang | G01C 21/005 |
| 2022/0345607 A1* | 10/2022 | Li | G06T 7/70 |
| 2023/0269489 A1* | 8/2023 | Gandhi | H04N 23/951 |
| 2023/0388668 A1* | 11/2023 | Yin | H04N 23/56 |

FOREIGN PATENT DOCUMENTS

| | | |
|---|---|---|
| CN | 107231530 A | 10/2017 |
| CN | 108419023 A | 8/2018 |
| CN | 108881731 A | 11/2018 |
| CN | 108989700 A | 12/2018 |
| CN | 109005346 A | 12/2018 |
| CN | 109005361 A | 12/2018 |
| CN | 109120862 A | 1/2019 |
| CN | 109286758 A | 1/2019 |
| CN | 110381263 A | 10/2019 |
| CN | 110572585 A | 12/2019 |
| CN | 111479072 A | 7/2020 |
| EP | 2175635 A1 | 4/2010 |
| WO | WO2018190649 A1 | 10/2018 |

* cited by examiner

HIGH DYNAMIC RANGE IMAGE SYNTHESIS METHOD AND APPARATUS, IMAGE PROCESSING CHIP AND AERIAL CAMERA

CROSS-REFERENCE TO RELATED APPLICATIONS

The present application is a continuation of International Application No. PCT/CN2021/083350, filed on Mar. 26, 2021, which claims priority to Chinese Patent Application No 2020102915710, filed on Apr. 14, 2020, which is incorporated herein by reference in its entirety.

TECHNICAL FIELD

The disclosure relates to the field of image processing technologies, and in particular, to a high dynamic range (HDR) image synthesis method and apparatus, an image processing chip and an aerial camera.

BACKGROUND

A high dynamic range (HDR) image is image data that may provide more details of bright and dark images and can reflect the visual effect in the real environment more desirably relative to a common image. Generally, the HDR image is synthesized by a plurality of common images having different exposure time (that is, a low dynamic range) by using the optimal detail corresponding to each exposure time.

However, the obtained HDR image is synthesized after the plurality of common images are generated through a plurality of exposures. Problems such as smearing of a moving object, a decrease in the picture definition, and sometimes even an error in brightness easily occur in a specific application scene such as aerial photography with a high moving rate.

Therefore, how to avoid the defects such as the smearing of a moving object and the decrease in the picture definition caused by synthesizing the HDR image through the plurality of images is an urgent problem to be solved.

SUMMARY

Embodiments of the disclosure are intended to provide a high dynamic range (HDR) image synthesis method and apparatus, an image processing chip and an aerial camera, which can solve the defects existing in the HDR image synthesis method.

To resolve the foregoing technical problems, the embodiments of the disclosure provide the following technical solutions. An HDR image synthesis method is provided, including:

acquiring a plurality of to-be-synthesized images, each having different exposure time; calculating a mean brightness of the to-be-synthesized images; determining an image brightness type of the to-be-synthesized images according to the mean brightness; calculating a brightness difference between adjacent pixel points in one to-be-synthesized image; calculating an inter-frame difference of different to-be-synthesized images at a same pixel point position according to the brightness difference; determining a motion state of the to-be-synthesized images at the pixel point position according to the inter-frame difference; and weighting and synthesizing the to-be-synthesized images into a corresponding HDR image according to the image brightness type and the motion state.

Optionally, the image brightness type includes a high-light image and a low-light scene. The determining an image brightness type of the to-be-synthesized images according to the mean brightness specifically includes: determining that the image brightness type of the to-be-synthesized image is the high-light image when the mean brightness is greater than or equal to a preset brightness detection threshold; and determining that the image brightness type of the to-be-synthesized image is the low-light scene when the mean brightness is less than the brightness detection threshold.

Optionally, the calculating a mean brightness of the to-be-synthesized images specifically includes: superimposing brightness values of all pixel points in the to-be-synthesized image to obtain an accumulated brightness value; summing the accumulated brightness values of all of the to-be-synthesized images to obtain a total brightness value; and calculating the mean brightness value according to the total brightness value, a quantity of the to-be-synthesized images and sizes of the to-be-synthesized images.

Optionally, the to-be-synthesized images include a short-exposure image, a medium-exposure image and a long-exposure image that are continuously shot. An exposure time of the short-exposure image is less than an exposure time of the medium-exposure image, and the exposure time of the medium-exposure image is less than an exposure time of the long-exposure image.

Optionally, the motion state includes a moving pixel and a stationary pixel. The determining a motion state of the to-be-synthesized images at the pixel point position according to the inter-frame difference specifically includes: determining whether an inter-frame difference between the short-exposure image and the medium-exposure image and an inter-frame difference between the medium-exposure image and the long-exposure image are both greater than or equal to a preset motion detection threshold; when the inter-frame difference between the short-exposure image and the medium-exposure image and an inter-frame difference between the medium-exposure image and the long-exposure image are both less than a preset motion detection threshold, determining that a motion state at the pixel point position is the moving pixel; and when the inter-frame difference between the short-exposure image and the medium-exposure image and an inter-frame difference between the medium-exposure image and the long-exposure image are both more than a preset motion detection threshold, determining that a motion state at the pixel point position is the stationary pixel.

Optionally, the calculating a brightness difference between adjacent pixel points in one to-be-synthesized image specifically includes: calculating a first brightness difference between a target pixel point and an adjacent first pixel point and a second brightness difference between the target pixel point and an adjacent second pixel point; and acquiring a difference between the first brightness difference and the second brightness difference as a brightness difference of the target pixel point.

Optionally, the weighting and synthesizing the plurality of to-be-synthesized images into a corresponding HDR image according to the image brightness type and the motion state specifically includes:

respectively presetting a corresponding short-exposure weight coefficient, a medium-exposure weight coefficient and a long-exposure weight coefficient for the short-exposure image, the medium-exposure image and the long-exposure image; and weighting and synthesizing pixel points of the short-exposure image, the medium-exposure image and the long-exposure image at the pixel point position into a pixel point of the HDR image at a same pixel point position according to the short-exposure weight coefficient, the medium-exposure weight coefficient and the long-exposure weight coefficient when the motion state at the pixel point position is the stationary pixel and the image brightness type is a high-light image.

Optionally, the weighting and synthesizing the plurality of to-be-synthesized images into a corresponding HDR image according to the image brightness type and the motion state specifically includes:

discarding the short-exposure image and the long-exposure image when the motion state at the pixel point position is the stationary pixel and the image brightness type is the high-light image;

weighting and synthesizing the pixel points of the medium-exposure image at the pixel point position into the pixel point of the HDR image at the same pixel point position according to the medium-exposure weight coefficient;

discarding the short-exposure image when the motion state is the stationary pixel and the image brightness type is a low-light image;

weighting and synthesizing the pixel points of the medium-exposure image and the long-exposure image at the pixel point position into the pixel point of the HDR image at the same pixel point position according to the medium-exposure weight coefficient and the long-exposure weight coefficient;

discarding the medium-exposure image and the long-exposure image when the motion state is the moving pixel and the image brightness type is the low-light image; and weighting and synthesizing the pixel points of the short-exposure image at the pixel point position into the pixel point of the HDR image at the same pixel point position according to the short-exposure weight coefficient.

In order to resolve the above technical problem, the embodiments of the disclosure further provide the following technical solution. An HDR image synthesis apparatus is provided, including:

an image acquisition module, configured to acquire a plurality of to-be-synthesized images, each having different exposure time; a scene detection module, configured to calculate a mean brightness of the to-be-synthesized images, and determine an image brightness type of the to-be-synthesized images according to the mean brightness; a secondary difference calculation module, configured to calculate a brightness difference between adjacent pixel points in one to-be-synthesized image, and calculate an inter-frame difference of the to-be-synthesized image at a same pixel point position according to the brightness difference; a motion detection module, configured to determine a motion state of the to-be-synthesized images at the pixel point position according to the inter-frame difference; and a synthesis module, configured to weight and synthesize the to-be-synthesized images into a corresponding HDR image according to the image brightness type and the motion state.

In order to resolve the above technical problem, the embodiments of the disclosure further provide the following technical solution: an image processing chip, including a processor and a memory communicatively connected to the processor. The memory stores a computer program instruction, and the computer program instruction, when invoked by the processor, causes the processor to perform the HDR image synthesis method as described above.

In order to resolve the above technical problem, the embodiments of the disclosure further provide the following technical solution: an aerial camera. The aerial camera includes:

an image sensor, configured to capture a plurality of images with set shooting parameters; a controller, connected to the image sensor and configured to trigger the image sensor to capture the plurality of images with different exposure time; an image processor, configured to receive the plurality of images captured by the image sensor through continuous exposure and perform the above HDR image synthesis method on the received plurality of images to obtain an HDR image; and a storage device, connected to the image processor and configured to store the HDR image.

Compared with the prior art, according to the HDR image synthesis method in the embodiment of the disclosure, a weight ratio of different common images is adaptively adjusted during synthesizing of the HDR image according to different motion states and different image brightness types of the to-be-synthesized images, thereby effectively avoiding the problems of the smearing of a moving object and the decreased picture definition during the synthesis into the HDR image from the plurality of images.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the disclosure, the disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the disclosure, rather than indicating or implying that the mentioned apparatus or component needs to have a particular orientation or needs to be constructed and operated in a particular orientation. Therefore, such terms should not be construed as limiting of the disclosure. In addition, terms "first", "second" and "third" are only used to describe the objective and cannot be understood as indicating or implying relative importance.

Unless otherwise defined, meanings of all technical and scientific terms used in this specification are the same as those usually understood by a person skilled in art of the disclosure. Terms used in the specification of the disclosure are merely intended to describe objectives of the specific embodiments and are not intended to limit the disclosure. A term "and/or" used in this specification includes any or all combinations of one or more related listed items.

In addition, technical features involved in different embodiments of the disclosure described below may be combined together if there is no conflict.

When a camera captures a picture, exposure time of different lengths may change an amount of transmitted light that enters a photosensitive element, thereby obtaining images having different details. A high dynamic range (HDR) image is synthesized by a plurality of common images having different exposure time, so as to show details of brightness more desirably.

In some shooting environments, such as in case of high-speed movement, an image having an inappropriate exposure time has an obvious quality problem. Therefore, these images are required to be screened and adjusted, so as to more effectively improve the quality of the HDR image obtained by synthesis, thereby avoiding the problems such as the decrease in picture definition and an error in brightness.

Figure 1:
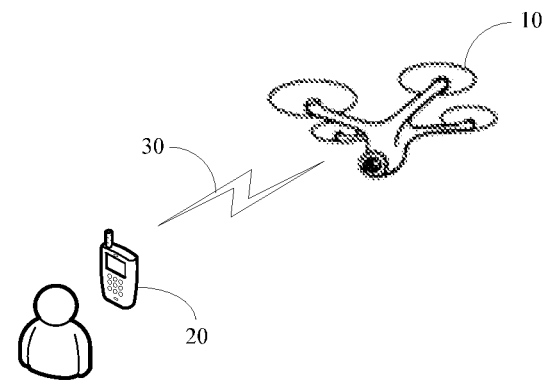
FIG. 1 is a schematic diagram of an application scene of a high dynamic range (HDR) image synthesis method according to an embodiment of the disclosure.

FIG. 1 shows an application scene of an HDR image synthesis method according to an embodiment of the disclosure. As shown in FIG. 1, in the application scene, an unmanned aerial vehicle (UAV) 10 equipped with an aerial camera, a smart terminal 20, and a wireless network 30 are included.

The UAV 10 may be any type of power-driven UAV. The UAV includes but is not limited to a four-axis UAV, a fixed-wing aircraft, a helicopter model, and the like. The UAV may have a corresponding volume or power according to actual conditions, so as to provide a load capacity, a flight speed and a flight range that can meet use requirements.

The aerial camera may be any type of image acquisition device, including a sports camera, a high-definition camera or a wide-angle camera. As a functional module mounted to the UAV, the aerial camera may be mounted and fixed to the UAV by a mounting and fixing bracket such as a gimbal, and is controlled by the UAV 10 to execute a task of image acquisition.

Certainly, one or more functional modules may further be arranged on the UAV, so that the UAV can realize a corresponding function. For example, as a control core for UAV flight and data transmission or an image transmission apparatus, a built-in main control chip uploads captured image information to a device that establishes a connection to the UAV.

The smart terminal 20 may be any type of smart device configured to establish a communication connection to the UAV, for example, a mobile phone, a tablet computer, a smart remote control or the like. The smart terminal 20 may be equipped with one or more different user interactive apparatuses for collecting instructions from a user or displaying and feeding back information to the user.

The interactive apparatuses include but are not limited to a button, a display screen, a touch screen, a speaker and a remote control joystick. For example, the smart terminal 20 may be equipped with a touch display screen. Through the touch display screen, a remote control instruction for the UAV is received from a user, and image information obtained by the aerial camera is presented to the user. The user may further switch the image information currently displayed on the display screen through a remote touch screen.

In some embodiments, the existing image visual processing technology may further be fused between the UAV 10 and the smart terminal 20 to further provide more intelligent services. For example, the UAV 10 may capture an image through the aerial camera, and then the smart terminal 20 parses an operation gesture in the image, so as to realize gesture control for the UAV 10 by the user.

The wireless network 30 may be a wireless communication network configured to establish a data transmission channel between two nodes based on any type of data transmission principle, for example, a Bluetooth network, a Wi-Fi network, a wireless cellular network, or a combination thereof in specific signal frequency bands.

Figure 2:
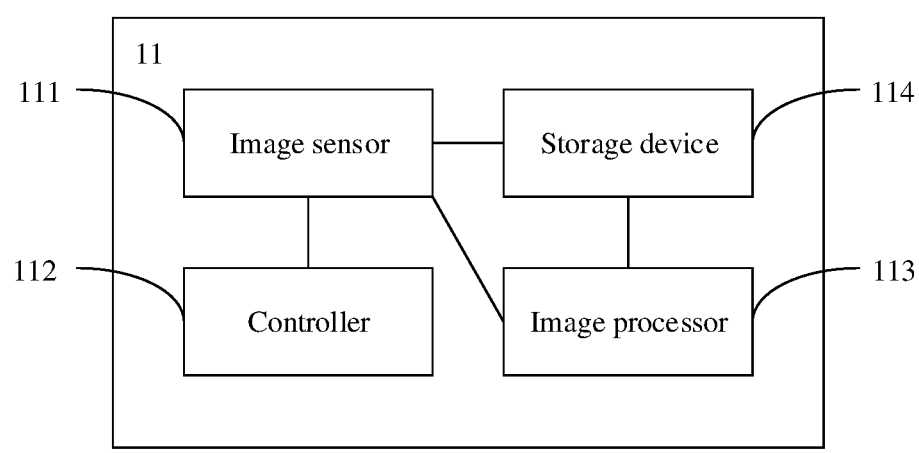
FIG. 2 is a structural block diagram of an aerial camera according to an embodiment of the disclosure.

FIG. 2 is a structural block diagram of an aerial camera 11 according to an embodiment of the disclosure. As shown in FIG. 2, the aerial camera 11 may include an image sensor 111, a controller 112, and an image processor 113.

The image sensor 111 is a functional module configured to capture an image with set shooting parameters. An optical signal corresponding to a visual picture is projected onto a photosensitive element through a lens and a related optical component, and the photosensitive element converts the optical signal to a corresponding electrical signal.

The shooting parameters are adjustable parameter variables such as an aperture, a focal length or an exposure time that are related to a structure of the lens and the related optical component (such as a shutter) during image acquisition of the image sensor 111. The image sensor 111 may capture one image through each exposure.

The controller 112 is a control core of the image sensor 111. The controller is connected to the image sensor, and may accordingly control a shooting behavior of the image sensor 111 according to the received instruction. For example, one or more shooting parameters of the image sensor 111 are set.

Under an appropriate trigger condition, the controller 112 may trigger the image sensor to continuously capture a plurality of images with different exposure time. A quantity of the captured images is a constant value set artificially, which may be a default value preset by a technician, or may be a value set by a user according to synthesis requirements of the HDR image during use.

For example, three images having different exposure time may be continuously captured. The images are respectively referred to as a short-exposure image, a medium-exposure image and a long-exposure image based on the exposure time.

The image processor 113 is a functional module configured to synthesize the HDR image. The image processor may receive the plurality of images continuously captured by the image sensor and synthesize the images into a corresponding HDR image.

In some embodiments, the aerial camera may further include a storage device 114 configured to store data information generated by the aerial camera 11 during use, for example, store the to-be-synthesized image, the synthesized HDR image, and the like. The storage device may specifically adopt any type of non-volatile memory having a suitable capacity, such as an SD card, a flash memory, or a solid-state hard disk.

In some embodiments, the storage device 114 may further be a detachable structure or a structure in a distributed arrangement. The aerial camera may be provided with only a data interface, and the data of the to-be-synthesized image or the HDR image is transmitted to the corresponding device for storage through the data interface.

It should be noted that one or more functional modules (such as the controller, the image processor and the storage device) of the aerial camera 11 shown in FIG. 2 may also be integrated into the UAV 10 as a part of the UAV 10. In FIG. 2, the functional module of the aerial camera 11 is exemplarily described only based on the image capture process, which is not intended to limit the functional module of the aerial camera 11.

Figure 3:
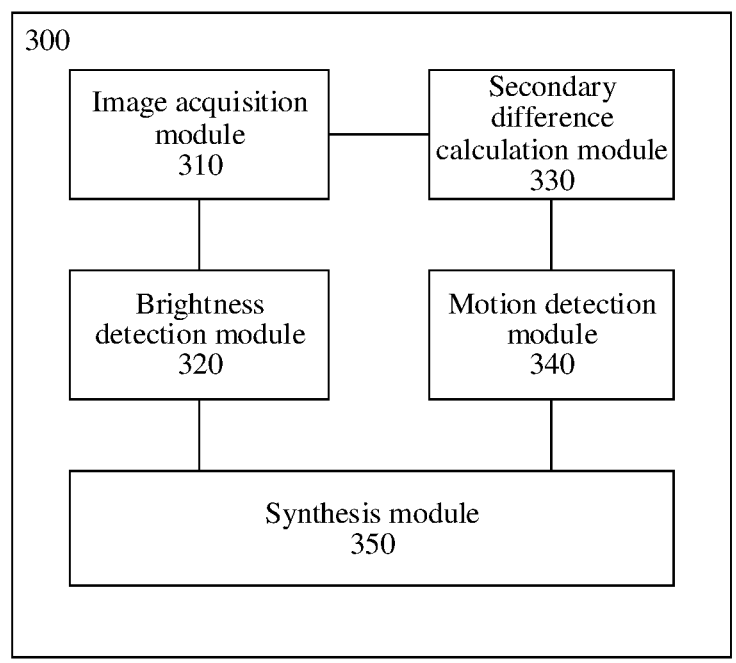
FIG. 3 is a schematic diagram of an HDR image synthesis apparatus according to an embodiment of the disclosure.

FIG. 3 is a structural block diagram of an HDR image synthesis apparatus according to an embodiment of the disclosure. The HDR image synthesis apparatus may be executed by the above image processor. In this embodiment, the composition of the HDR image synthesis apparatus is described by using the functional module.

Those skilled in the art can understand that the functional module shown in FIG. 3 may be implemented through software, hardware or a combination of the software and the hardware according to the actual situation. For example, the functional module may be implemented by the processor invoking a relevant software application stored in a memory.

As shown in FIG. 3, the HDR image synthesis apparatus 300 includes an image acquisition module 310, a brightness detection module 320, a secondary difference calculation module 330, a motion detection module 340 and a synthesis module 350.

The image acquisition module 310 is configured to acquire a plurality of to-be-synthesized images. Each of the to-be-synthesized images has a different exposure time. The to-be-synthesized images are image data information captured by the image sensor through one exposure. The to-be-synthesized images that are continuously captured may be assembled into an image set configured to synthesize a final HDR image.

The brightness detection module 320 is configured to calculate a mean brightness of the to-be-synthesized images and determine an image brightness type of the to-be-synthesized images according to the mean brightness.

The to-be-synthesized images may have significantly different image brightness depending on different environments where the to-be-synthesized image is located when being shot. In this embodiment, each to-be-synthesized image may be roughly divided into different image brightness types according to a difference in the image brightness.

For example, the to-be-synthesized image may be divided into two different image brightness types: a high-light image and a low-light image based on when it is captured (in the daytime or in the nighttime).

The secondary difference calculation module 330 is configured to calculate a brightness difference between adjacent pixel points in one to-be-synthesized image, and calculate an inter-frame difference of the to-be-synthesized image at a same pixel point position according to the brightness difference. The inter-frame difference indicates a change situation between different to-be-synthesized images within a specific area.

The motion detection module 340 is configured to determine a motion state of the to-be-synthesized images at the pixel point position according to the inter-frame difference.

The inter-frame difference calculated by the secondary difference calculation module 330 indicates a dynamic change situation of a certain area in time. Therefore, it may be accordingly determined whether different positions of the images are changed, so as to determine the motion state at the pixel point position. A specific motion state may be determined according to the actual situation.

For example, the motion state may be simply divided into a moving pixel and a stationary pixel. The moving pixel indicates that the image at the pixel point position is moved. The stationary pixel indicates that the image at that pixel point position is not moved.

The synthesis module 350 is configured to weight and synthesize the to-be-synthesized images into a corresponding HDR image according to the image brightness type and the motion state.

"Weighting and synthesis" mean assigning a corresponding weight to a different to-be-synthesized image, so as to obtain a required HDR image through synthesis. Some to-be-synthesized images with poor image quality may be less frequently considered by adjusting the weight of the to-be-synthesized images, so as to reduce the impact of these to-be-synthesized images on the quality of the HDR image.

In this embodiment, the weights of the to-be-synthesized images are adaptively adjusted and considered according to the image brightness type and the motion state, thereby effectively avoiding the interference of some to-be-synthesized images, which is beneficial to improve the quality of the HDR image.

However, in the application scene shown in FIG. 1, the aerial camera mounted to the UAV is used as an example. Those skilled in the art may understand that the HDR image synthesis method may further be used in other types of scenes and devices, so as to improve the quality of the output HDR image. The HDR image synthesis method disclosed in the embodiment of the disclosure is not limited to application on the UAV shown in FIG. 1.

Figure 4:
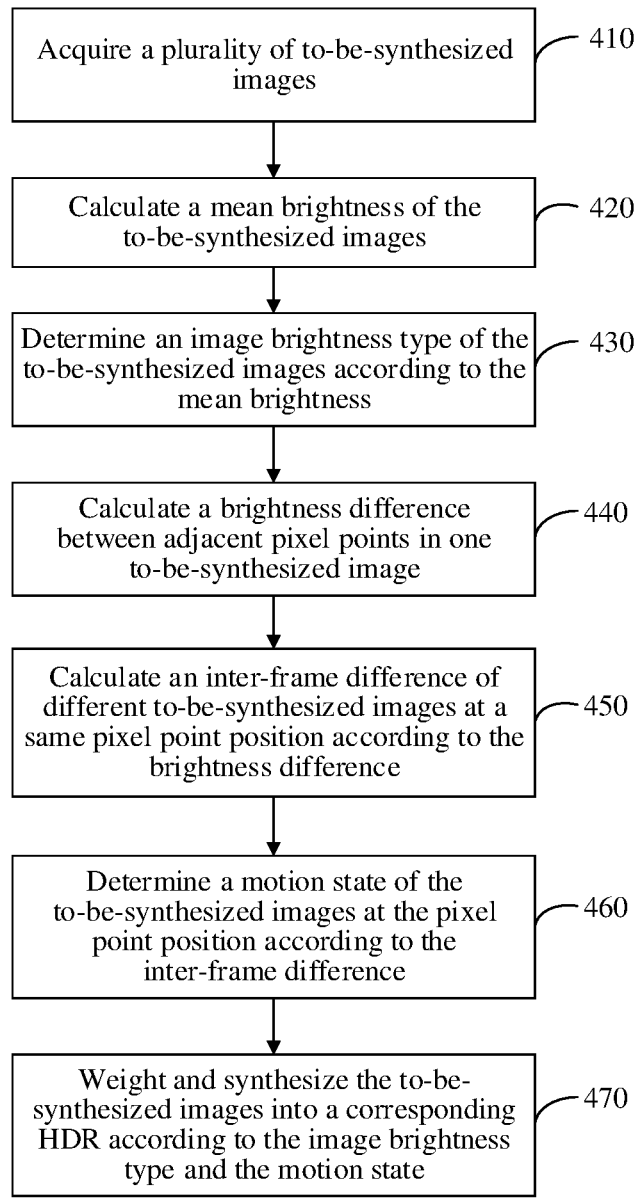
FIG. 4 is a method flowchart of an image processing method according to an embodiment of the disclosure.

FIG. 4 is a method flowchart of an HDR synthesis method according to an embodiment of the disclosure. As shown in FIG. 4, the image processing method includes the following steps.

410. Acquire a plurality of to-be-synthesized images.

Each of the to-be-synthesized images has a different exposure time. A specific exposure time may be set according to an actual situation, which is an empirical value, and the details are not described herein. These to-be-synthesized images are some images continuously shot. The images are configured as a data base to be synthesized into an HDR image.

420. Calculate a mean brightness of the to-be-synthesized images.

The "mean brightness" is an overall image brightness in the to-be-synthesized image, which reflects the light intensity of a surrounding environment during the image capturing. A higher mean brightness indicates a higher light intensity of the surrounding environment during capturing of the to-be-synthesized image.

Specifically, the mean brightness may be calculated in any suitable manner. In some embodiments, the mean brightness may be calculated in the following manner.

First, brightness values of all pixel points in the to-be-synthesized image are superimposed to obtain an accumulated brightness value. Then, the accumulated brightness values of all of the to-be-synthesized images are summed to obtain a total brightness value. Finally, the mean brightness value is calculated according to the total brightness value, a quantity of the to-be-synthesized images and sizes of the to-be-synthesized images. In this way, the mean brightness value of the plurality of to-be-synthesized images at one pixel point position may be calculated and used as the "mean brightness".

430. Determine an image brightness type of the to-be-synthesized image according to the mean brightness.

The image brightness type is a type that is determined or divided in advance according to a difference in brightness. Under different use conditions, an appropriate quantity of image brightness types may be divided according to use requirements, so that the to-be-synthesized images having a similar mean brightness are used as the same image brightness type for further processing.

In some embodiments, the image brightness type to which the to-be-synthesized image belongs may be determined by setting an appropriate brightness detection threshold. For example, a brightness detection threshold can be preset when the image brightness type includes a high-light image and a low-light image.

When the mean brightness is greater than or equal to a preset brightness detection threshold, it is determined that the to-be-synthesized image is the high-light image. When the mean brightness is less than the brightness detection threshold, it is determined that the to-be-synthesized image is the low-light image.

The brightness detection threshold is an empirical value, which may be set according to the actual situation. The high-light image corresponds to a scene with enough light or enough brightness in the daytime. The low-light image indicates that a shooting scene of the to-be-synthesized image is a scene with severely insufficient light at night.

440. Calculate a brightness difference between adjacent pixel points in one to-be-synthesized image.

The to-be-synthesized image is actually composed of a plurality of different pixel points. The pixel point is a smallest basic unit in an image. In one image, the difference between adjacent pixel points roughly reflects the texture of a shot object.

Specifically, a specific calculation method for the brightness difference may include the following steps.

First, a first brightness difference of a target pixel point and an adjacent first pixel point and a second brightness difference between a target pixel point and an adjacent second pixel point are calculated. Then, a difference between the first brightness difference and the second brightness difference is acquired as a brightness difference of the target pixel point.

Figure 6:
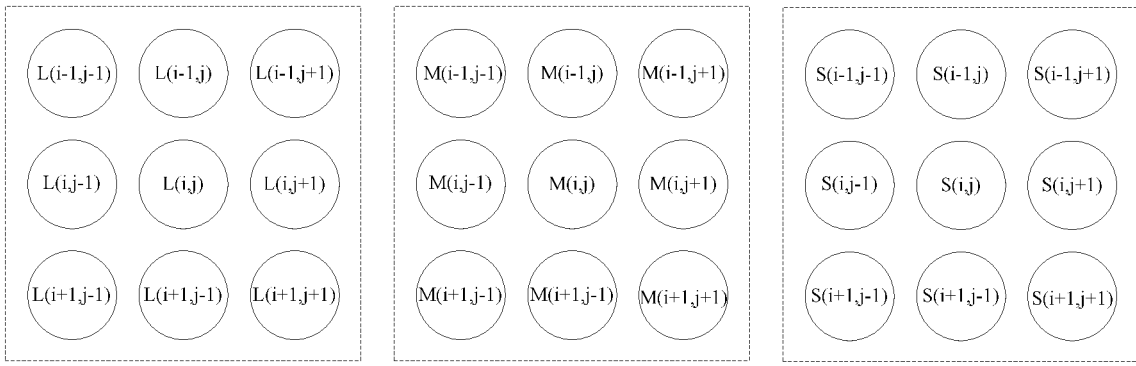
FIG. 6 is a schematic diagram of pixel point positions according to an embodiment of the disclosure.

The target pixel point is currently selected, and the pixel point for determining the motion state is required to be calculated. As shown in FIG. 6, for any pixel point, a surrounding edge of the pixel point can be surrounded by eight adjacent pixel points. The first pixel point and the second pixel point are two of the eight pixel points around the target pixel point.

450. Calculate an inter-frame difference of different to-be-synthesized images at a same pixel point position according to the brightness difference.

The inter-frame difference is calculated from a difference between the brightness differences in the different to-be-synthesized images at the same position. It may be understood by those skilled in the art that, in a case that a shot object does not move significantly, the texture of the plurality of continuously shot images at the same position is not to change significantly.

Therefore, the inter-frame difference obtained based on a secondary difference can reflect the movement situation of the shot object. In a case that the inter-frame difference is excessively large, it indicates that the shot object moves violently. In a case that the inter-frame difference is relatively small, it indicates that the position of the shot object is basically not changed.

Due to the significantly different exposure time between the to-be-synthesized images, a relatively large brightness difference exists between the different to-be-synthesized images. The conventional method of comparing the brightness difference of the same pixel point position to detect whether the shot object moves cannot exclude the brightness difference existing in the to-be-synthesized image.

The secondary difference provided in this embodiment is based on the brightness difference between the adjacent pixel points to measure the difference between the different to-be-synthesized images, which can effectively avoid the impact brought by the brightness difference existing in the to-be-synthesized images, and serves as an accurate determination basis for motion detection.

460. Determine a motion state of the to-be-synthesized images at the pixel point position according to the inter-frame difference.

The motion state means whether a shot object moves. Specifically, the pixel point position where the shot object has moved may be referred to as a moving pixel. The pixel point position when the shot object has not moved is referred to as a stationary pixel.

Figure 5:
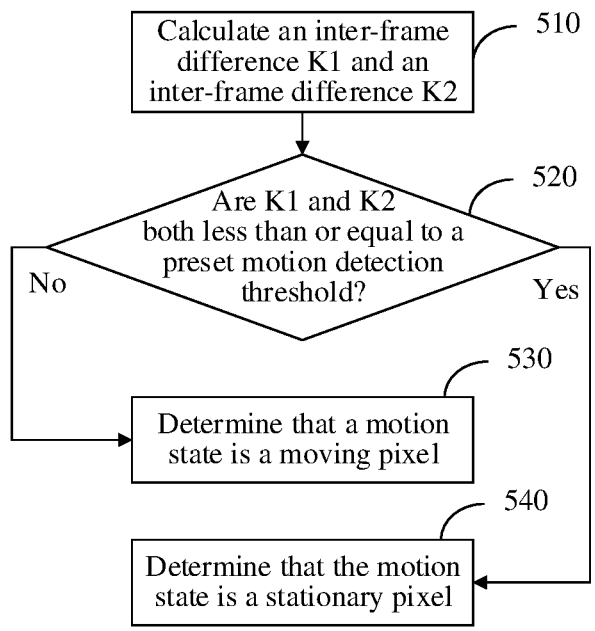
FIG. 5 is a method flowchart of a motion state determination method according to an embodiment of the disclosure.

The to-be-synthesized image including a short-exposure image, a medium-exposure image and a long-exposure image that are continuously shot is used as an example (an exposure time of the short-exposure image is less than an exposure time of the medium-exposure image, and the exposure time of the medium-exposure image is less than an exposure time of the long-exposure image). A specific determination process of the motion state is described in detail. As shown in FIG. 5, a method for determining the motion state includes the following steps.

470. Weight and synthesize the to-be-synthesized images into a corresponding HDR image according to the image brightness type and the motion state.

510. Calculate an inter-frame difference K1 between the short-exposure image and the medium-exposure image and an inter-frame difference K2 between the medium-exposure image and the long-exposure image.

520. Determine whether K1 and K2 are both less than or equal to a preset motion detection threshold. when the inter-frame difference between the short-exposure image and the medium-exposure image and an inter-frame difference between the medium-exposure image and the long-exposure image are both more than a preset motion detection threshold, step 530 is performed, and when the inter-frame difference between the short-exposure image and the medium-exposure image and an inter-frame difference between the medium-exposure image and the long-exposure image are both less than a preset motion detection threshold, step 540 is performed.

The motion detection threshold is an empirical value, which may be set according to the actual situation.

530. Determine that a motion state at the pixel point position is the moving pixel.

The "moving pixel" means that the shot object at the pixel point position moves. In this embodiment, the pixels of all to-be-synthesized images at this position are referred to as the "moving pixel".

540. Determine that a motion state at the pixel point position is the stationary pixel.

The "stationary pixel" means that the shot object at the pixel point position does not move. In this embodiment, the pixels of all to-be-synthesized images at this position are referred to as the "stationary pixel".

As described above, the two indicators including the image brightness type and the motion state can well reflect the scene situation of the to-be-synthesized image during shooting. Therefore, the weight of each to-be-synthesized image in the synthesis process can be adaptively adjusted, so that the synthesized HDR image has better image quality.

Similarly, a specific weighting and synthesis process is described in detail by using the to-be-synthesized image including a short-exposure image, a medium-exposure image and a long-exposure image continuously shot as an example.

In this embodiment, each pixel point of the same HDR image is calculated and determined by weighting and synthesizing of the pixel points of the to-be-synthesized images at the same pixel point position. The specific weighting and synthesis process is as follows.

First, a corresponding short-exposure weight coefficient, a medium-exposure weight coefficient and a long-exposure weight coefficient are respectively preset for the short-exposure image, the medium-exposure image and the long-exposure image.

The short-exposure weight coefficient, the medium-exposure weight coefficient and the long-exposure weight coefficient are all preset weight values, which can be adjusted or set accordingly according to the actual situation, indicating the weight ratio of the to-be-synthesized images during synthesizing of the HDR image in general.

Then the motion state at the pixel point position and the image brightness type of the to-be-synthesized image are determined, which are respectively divided into the following situations for processing.

1) Pixel points of the short-exposure image, the medium-exposure image and the long-exposure image at the pixel point position are weighted and synthesized into a pixel point of the HDR image at a same pixel point position according to the short-exposure weight coefficient, the medium-exposure weight coefficient and the long-exposure weight coefficient when the motion state at the pixel point position is the stationary pixel and the image brightness type is a high-light image.

Stationariness and sufficient illumination may be considered as ideal conditions, and in ideal conditions, the weight coefficient is not required to be adjusted, and the preset weight ratio can be directly used.

2) When the motion state at the pixel point position is the stationary pixel and the image brightness type is a high-light image, the short-exposure image and the long-exposure image are discarded, and the pixel points of the medium-exposure image at the pixel point position are weighted and synthesized into the pixel point of the HDR image at the same pixel point position according to the medium-exposure weight coefficient.

Under conditions of motion and sufficient illumination, an excessively long exposure time and an excessively short exposure time cannot achieve good shooting quality (problems of blur and dimness easily occur). Therefore, the weight coefficients of the short-exposure image and the long-exposure image are required to be adjusted to zero to avoid causing an adverse effect on the finally synthesized HDR image.

3) When the motion state is the stationary pixel and the image brightness type is the low-light image, the short-exposure image is discarded, and the pixel points of the medium-exposure image and the long-exposure image at the pixel point position are weighted and synthesized into the pixel point of the HDR image at the same pixel point position according to the medium-exposure weight coefficient and the long-exposure weight coefficient.

In the case of low light, more light noise occurs to the to-be-synthesized image having a relatively short exposure time, and therefore the image quality is relatively poor. Therefore, the weight coefficient of the short-exposure image can be adjusted to zero in this case, so as to avoid causing an adverse effect on the finally synthesized HDR image.

4) When the motion state is the moving pixel and the image brightness type is a low-light image, the medium-exposure image and the long-exposure image are discarded, and the pixel points of the short-exposure image at the pixel point position are weighted and synthesized into the pixel point of the HDR image at the same pixel point position according to the short-exposure weight coefficient.

In a state of low light and a moving shot object, a relatively long exposure time is required to ensure an amount of transmitted light, and a clear image of the shot object can be obtained. Therefore, the weight coefficients of the short-exposure image and the medium-exposure image may be adjusted to zero to avoid causing an adverse effect on the finally synthesized HDR image.

Through the adaptive adjustment of the above weight coefficients to avoid the interference of some to-be-synthesized images having poor quality, the finally outputted HDR image can have an HDR and high definition in a stationary scene in the daytime, and has a desirable technical effect of low picture noise and no smearing during the motion in the night scene.

In order to fully describe the disclosure, an execution process of the HDR image synthesis method disclosed in the embodiments of the disclosure in the image processor is described in detail below with reference to specific examples.

It is assumed that the image sensor continuously captures a short-exposure image with an exposure time of x/2, a medium-exposure image with an exposure time of x, and a long-exposure image with an exposure time of 2× as a to-be-synthesized image each time. A length of the to-be-synthesized image is w pixels, and a width thereof is h pixels.

Preferably, the short-exposure image is first transmitted to the image processor after being shot, and the medium-exposure image and the long-exposure image are transmitted in sequence, so that the overall image synthesis process has a minimum delay.

During the processing, the mean brightness of the to-be-synthesized image is calculated by a brightness detection module 320 through the following equation (1):

$$L = \frac{\sum_{i=1,j=1}^{i=w,j=h} S_{(i,j)} + \sum_{i=1,j=1}^{i=w,j=h} M_{(i,j)} + \sum_{i=1,j=1}^{i=w,j=h} L_{(i,j)}}{w \times h \times 3} \quad (1)$$

$S_{(i,j)}$ is a brightness value of a pixel point in an $i^{th}$ row and a $j^{th}$ column of the short-exposure image, $M_{(i,j)}$ is a brightness value of a pixel point in an $i^{th}$ row and a $j^{th}$ column of the medium-exposure image, $L_{(i,j)}$ is a brightness value of a pixel point in an $i^{th}$ row and a $j^{th}$ column of the long-exposure image, and L is the mean brightness.

The brightness detection module 320 is configured to determine whether the mean brightness L is greater than or equal to a preset brightness detection threshold T. When the mean brightness L is greater than or equal to the brightness detection threshold T, it is determined that the image brightness type of the to-be-synthesized image is the high-light image. When the mean brightness L is less than the brightness detection threshold T, it is determined that the image brightness type of the to-be-synthesized image is the low-light image.

In addition, the brightness difference between the adjacent pixel points is calculated by the secondary difference calculation module 330 through the following equations (2-1) to (2-3):

$$\Delta S_{(i,j)} = \|S_{(i,j)} - S_{(i+1,j)}\| - \|S_{(i,j)} - S_{(i,j+1)}\| \quad (2\text{-}1)$$

$$\Delta M_{(i,j)} = \|M_{(i,j)} - M_{(i+1,j)}\| - \|M_{(i,j)} - M_{(i,j+1)}\| \quad (2\text{-}2)$$

$$\Delta L_{(i,j)} = \|L_{(i,j)} - L_{(i+1,j)}\| - \|L_{(i,j)} - L_{(i,j+1)}\| \quad (2\text{-}3)$$

$\Delta S_{(i,j)}$ is a brightness difference of pixel points in an $i^{th}$ row and a $j^{th}$ column of the short-exposure image, $\Delta M_{(i,j)}$ is a brightness difference of pixel points in an $i^{th}$ row and a $j^{th}$ column of the medium-exposure image, and $\Delta L_{(i,j)}$ is a brightness difference of pixel points in an $i^{th}$ row and a $j^{th}$ column of the long-exposure image (as shown in FIG. 6, adjacent pixel points are eight pixel points around the target pixel point).

Based on the brightness difference, an inter-frame difference between the short-exposure image and the medium-exposure image can be calculated as $|\Delta S_{(i,j)} - \Delta M_{(i,j)}|$, and an inter-frame difference between the medium-exposure image and the long-exposure image is $|\Delta M(i,j) - \Delta L_{(i,j)}|$.

A motion detection module 340 determines, based on the inter-frame difference calculated by the secondary difference calculation module 330, whether the two inter-frame differences are both less than a preset motion detection threshold A.

When $|\Delta S_{(i,j)} - \Delta M_{(i,j)}| < A$ and $|\Delta M_{(i,j)} - \Delta L_{(i,j)}| < A$, the motion state at the pixel point position (i,j) is determined as the stationary pixel.

When one inter-frame difference is greater than or equal to the motion detection threshold A, the motion state at the pixel point position (i,j) is determined as the moving pixel.

The synthesis module 350 is connected to the brightness detection module 320 and the motion detection module 340, and adjusts and determines specific weight coefficients according to the image brightness type and the motion state provided by the brightness detection module and the motion detection module, so as to complete the synthesis of the HDR image.

An ideal weighting and synthesis process shown in the following equation (3) is preset in the synthesis module 350:

$$H_{(i,j)} = a \times S_{(i,j)} + b \times M_{(i,j)} + c \times L_{(i,j)} \quad (3)$$

a is a short-exposure weight coefficient, b is a medium-exposure weight coefficient, and c is a long-exposure weight coefficient. $S_{(i,j)}$ is a pixel point in an $i^{th}$ row and a $j^{th}$ column of the short-exposure image, $M_{(i,j)}$ is a pixel point in an $i^{th}$ row and a $j^{th}$ column of the medium-exposure image, $L_{(i,j)}$ is a pixel point in an $i^{th}$ row and a $j^{th}$ column of the long-exposure image, and $H_{(i,j)}$ is a pixel point in an $i^{th}$ row and a $j^{th}$ column of the synthesized HDR image.

When the image brightness type is the high-light image and the motion state is the stationary pixel, an ideal state is achieved. The synthesis module 350 performs weighting and synthesis according to the equation (3).

When the image brightness type is the high-light image and the motion state is the moving pixel, the synthesis module 350 adjusts coefficients a and c to zero, and performs the weighting and synthesis in the manner shown in the following equation (3-1):

$$H_{(i,j)} = b \times M_{(i,j)} \quad (3\text{-}1)$$

When the image brightness type is the low-light image and the motion state is the stationary pixel, the synthesis module 350 discards the short-exposure images having more noise, and performs the weighting and synthesis in the manner shown in the following equation (3-2):

$$H_{(i,j)} = b \times M_{(i,j)} + c \times L_{(i,j)} \quad (3\text{-}2)$$

When the image brightness type is the low-light image and the motion state is the moving pixel, the synthesis module 350 only uses the long-exposure image with a long enough exposure time to perform the weighting and synthesis in the manner shown in the following equation (3-3):

$$H_{(i,j)} = c \times L_{(i,j)} \quad (3\text{-}3)$$

Through the above method, the to-be-synthesized images shot by after a plurality of consecutive exposures may be integrated into the HDR image having higher image quality in a targeted manner, so as to avoid the problems such as smearing of a moving object, a decrease in picture definition, and even an error in brightness that easily occur during synthesizing of the HDR image in a high-speed moving scene such as aerial photography.

An embodiment of the disclosure further provides a non-volatile computer storage medium. The computer storage medium stores at least one executable instruction, and the computer-executable instruction can be used for performing the HDR image synthesis method in any of the above method embodiments.

Figure 7:
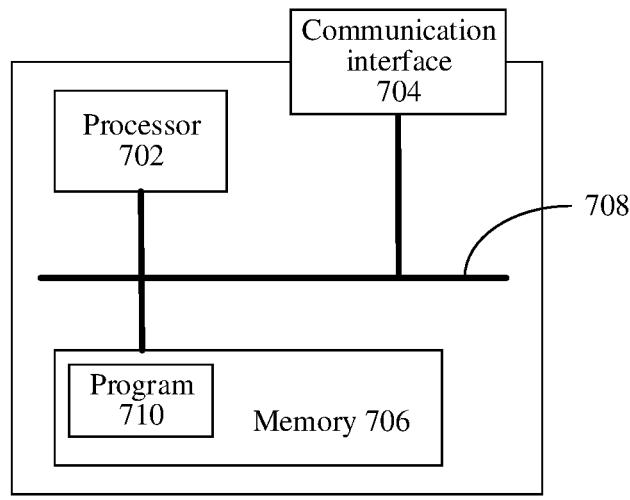
FIG. 7 is a schematic structural diagram of an image processing chip according to an embodiment of the disclosure.

FIG. 7 is a schematic structural diagram of an image processing chip according to an embodiment of the disclosure. The specific embodiments of the disclosure do not limit the specific implementation of the image processing chip.

As shown in FIG. 7, the image processing chip may include a processor 702, a communication interface 704, a memory 706, and a communication bus 708.

The processor 702, the communication interface 704, and the memory 706 communicate with each other through the communication bus 708. The communication interface 704 is configured to communicate with a network element of other devices such as a client or other servers. The processor 702 is configured to execute a program 710, and specifically may execute the relevant steps in the above embodiments of the HDR image synthesis method.

Specifically, the program 710 may include program code, and the program code includes a computer operation instruction.

The processor 702 may be a central processing unit (CPU), or an application specific integrated circuit (ASIC), or one or more integrated circuits configured to implement the embodiments of the disclosure. One or more processors included in a network slicing device may be a same type of processor, such as one or more CPUs, or may be different types of processors, such as one or more CPUs and one or more ASICs.

The memory 706 is configured to store the program 710. The memory 706 may include a high-speed RAM memory, or may further include a non-volatile memory, for example, at least one magnetic disk memory.

The program 710 can specifically be configured to cause the processor 702 to execute the HDR image synthesis method in any of the above method embodiments.

A person of ordinary skill in the art may further be aware that, in combination with examples of each step of the HDR image synthesis method described in the embodiments disclosed in this specification, the present application may be implemented by using electronic hardware, computer software, or a combination thereof. To clearly describe interchangeability between the hardware and the software, compositions and steps of each example have been generally described according to functions in the foregoing descriptions. Whether the functions are executed by hardware or software depends on particular applications and design constraint conditions of the technical solutions.

Persons skilled in the art can use different methods to implement the described functions for each particular application, but it should not be considered that the implementation goes beyond the scope of the embodiments of the disclosure. The computer software may be stored in a computer-readable storage medium. When being executed, the program may include the processes of the embodiments of the foregoing methods. The storage medium may be a magnetic disk, an optical disc, a read-only memory (ROM), or a random access memory (RAM).

Finally, it should be noted that the foregoing embodiments are merely used for describing the technical solutions of the disclosure, but are not intended to limit the disclosure. Under the concept of the disclosure, the technical features in the foregoing embodiments or different embodiments may be combined, the steps may be implemented in any sequence, and there may be many other changes in different aspects of the disclosure as described above. For brevity, those are not provided in detail. Although the disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the disclosure.

What is claimed is:

1. A high dynamic range (HDR) image synthesis method, comprising:
   acquiring a plurality of to-be-synthesized images, wherein each of the to-be-synthesized images has a different exposure time;
   calculating a mean brightness of the to-be-synthesized images;
   determining an image brightness type of the to-be-synthesized images according to the mean brightness;
   calculating a brightness difference between adjacent pixel points in one to-be-synthesized image;
   calculating an inter-frame difference of different to-be-synthesized images at a same pixel point position according to the brightness difference;
   determining a motion state of the to-be-synthesized images at the pixel point position according to the inter-frame difference; and
   weighting and synthesizing the to-be-synthesized images into a corresponding HDR image according to the image brightness type and the motion state.

2. The method according to claim 1, wherein the image brightness type comprises a high-light image and a low-light image; and
   the determining an image brightness type of the to-be-synthesized images according to the mean brightness specifically comprises:
   determining that the to-be-synthesized image is the high-light image when the mean brightness is greater than or equal to a preset brightness detection threshold; and
   determining that the to-be-synthesized image is the low-light image when the mean brightness is less than the brightness detection threshold.

3. The method according to claim 1, wherein the calculating a mean brightness of the to-be-synthesized image specifically comprises:
   superimposing brightness values of all pixel points in the to-be-synthesized image to obtain an accumulated brightness value;
   summing the accumulated brightness values of all of the to-be-synthesized images to obtain a total brightness value; and
   calculating the mean brightness value according to the total brightness value, a quantity of the to-be-synthesized images and sizes of the to-be-synthesized images.

4. The method according to claim 1, wherein the to-be-synthesized images comprise a short-exposure image, a medium-exposure image and a long-exposure image that are continuously shot;
   an exposure time of the short-exposure image is less than an exposure time of the medium-exposure image, and the exposure time of the medium-exposure image is less than an exposure time of the long-exposure image.

5. The method according to claim 4, wherein the motion state comprises a moving pixel and a stationary pixel; and
   the determining a motion state of the to-be-synthesized images at the pixel point position according to the inter-frame difference specifically comprises:
   determining whether an inter-frame difference between the short-exposure image and the medium-exposure image and an inter-frame difference between the medium-exposure image and the long-exposure image are both less than a preset motion detection threshold;
   determining that the motion state at the pixel point position is the stationary pixel when the inter-frame difference between the short-exposure image and the medium-exposure image and an inter-frame difference between the medium-exposure image and the long-exposure image are both less than a preset motion detection threshold; and
   determining that the motion state at the pixel point position is the moving pixel when the inter-frame difference between the short-exposure image and the medium-exposure image and an inter-frame difference between the medium-exposure image and the long-exposure image are both more than a preset motion detection threshold.

6. The method according to claim 1, wherein the calculating a brightness difference between adjacent pixel points in one to-be-synthesized image specifically comprises:
   calculating a first brightness difference between a target pixel point and an adjacent first pixel point and a second brightness difference between the target pixel point and an adjacent second pixel point; and acquiring a difference between the first brightness difference and the second brightness difference as a brightness difference of the target pixel point.

7. The method according to claim 5, wherein the weighting and synthesizing the plurality of to-be-synthesized images into a corresponding HDR image according to the image brightness type and the motion state specifically comprises:

respectively presetting a corresponding short-exposure weight coefficient, a medium-exposure weight coefficient and a long-exposure weight coefficient for the short-exposure image, the medium-exposure image and the long-exposure image; and weighting and synthesizing pixel points of the short-exposure image, the medium-exposure image and the long-exposure image at the pixel point position into a pixel point of the HDR image at a same pixel point position according to the short-exposure weight coefficient, the medium-exposure weight coefficient and the long-exposure weight coefficient when the motion state at the pixel point position is the stationary pixel and the image brightness type is a high-light image.

8. The method according to claim 7, wherein the weighting and synthesizing the plurality of to-be-synthesized images into a corresponding HDR image according to the image brightness type and the motion state specifically comprises:

discarding the short-exposure image and the long-exposure image when the motion state at the pixel point position is the stationary pixel and the image brightness type is the high-light image;

weighting and synthesizing the pixel points of the medium-exposure image at the pixel point position into the pixel point of the HDR image at the same pixel point position according to the medium-exposure weight coefficient;

discarding the short-exposure image when the motion state is the stationary pixel and the image brightness type is a low-light image;

weighting and synthesizing the pixel points of the medium-exposure image and the long-exposure image at the pixel point position into the pixel point of the HDR image at the same pixel point position according to the medium-exposure weight coefficient and the long-exposure weight coefficient;

discarding the medium-exposure image and the long-exposure image when the motion state is the moving pixel and the image brightness type is the low-light image; and weighting and synthesizing the pixel points of the short-exposure image at the pixel point position into the pixel point of the HDR image at the same pixel point position according to the short-exposure weight coefficient.

9. An image processing chip, comprising a processor and a memory communicatively connected to the processor, the memory storing a computer program instruction, the computer program instruction, when invoked by the processor, causing the processor to:

acquire a plurality of to-be-synthesized images, wherein each of the to-be-synthesized images has a different exposure time;

calculate a mean brightness of the to-be-synthesized images;

determine an image brightness type of the to-be-synthesized images according to the mean brightness;

calculate a brightness difference between adjacent pixel points in one to-be-synthesized image;

calculate an inter-frame difference of different to-be-synthesized images at a same pixel point position according to the brightness difference;

determine a motion state of the to-be-synthesized images at the pixel point position according to the inter-frame difference; and weight and synthesize the to-be-synthesized images into a corresponding HDR image according to the image brightness type and the motion state.

10. The image processing chip according to claim 9, wherein the image brightness type comprises a high-light image and a low-light image; and the processor is further configured to:

determine that the to-be-synthesized image is the high-light image when the mean brightness is greater than or equal to a preset brightness detection threshold; and determine that the to-be-synthesized image is the low-light image when the mean brightness is less than the brightness detection threshold.

11. The image processing chip according to claim 9, wherein the processor is further configured to:

superimpose brightness values of all pixel points in the to-be-synthesized image to obtain an accumulated brightness value;

sum the accumulated brightness values of all of the to-be-synthesized images to obtain a total brightness value; and calculate the mean brightness value according to the total brightness value, a quantity of the to-be-synthesized images and sizes of the to-be-synthesized images.

12. The image processing chip according to claim 9, wherein the to-be-synthesized images comprise a short-exposure image, a medium-exposure image and a long-exposure image that are continuously shot;

an exposure time of the short-exposure image is less than an exposure time of the medium-exposure image, and the exposure time of the medium-exposure image is less than an exposure time of the long-exposure image.

13. The image processing chip according to claim 12, wherein the motion state comprises a moving pixel and a stationary pixel; and the processor is further configured to:

determine whether an inter-frame difference between the short-exposure image and the medium-exposure image and an inter-frame difference between the medium-exposure image and the long-exposure image are both less than a preset motion detection threshold;

determine that the motion state at the pixel point position is the stationary pixel when the inter-frame difference between the short-exposure image and the medium-exposure image and an inter-frame difference between the medium-exposure image and the long-exposure image are both less than a preset motion detection threshold; and determine that the motion state at the pixel point position is the moving pixel when the inter-frame difference between the short-exposure image and the medium-exposure image and an inter-frame difference between the medium-exposure image and the long-exposure image are both more than a preset motion detection threshold.

14. The image processing chip according to claim 9, wherein the calculation of the brightness difference between the adjacent pixel points in one to-be-synthesized image specifically comprises:

calculating a first brightness difference between a target pixel point and an adjacent first pixel point and a second brightness difference between the target pixel point and an adjacent second pixel point; and acquiring a difference between the first brightness difference and the second brightness difference as a brightness difference of the target pixel point.

15. The image processing chip according to claim 13, wherein the processor is further configured to:

respectively preset a corresponding short-exposure weight coefficient, a medium-exposure weight coefficient and a long-exposure weight coefficient for the short-exposure image, the medium-exposure image and the long-exposure image; and weight and synthesize pixel points of the short-exposure image, the medium-exposure image and the long-exposure image at the pixel point position into a pixel point of the HDR image at the same pixel point position according to the short-exposure weight coefficient, the medium-exposure weight coefficient and the long-exposure weight coefficient when the motion state at the pixel point position is the stationary pixel and the image brightness type is a high-light image.

16. The image processing chip according to claim 15, wherein the processor is further configured to:

discard the short-exposure image and the long-exposure image when the motion state at the pixel point position is the stationary pixel and the image brightness type is the high-light image;

weight and synthesize the pixel points of the medium-exposure image at the pixel point position into the pixel point of the HDR image at the same pixel point position according to the medium-exposure weight coefficient;

discard the short-exposure image when the motion state is the stationary pixel and the image brightness type is a low-light image;

weight and synthesize the pixel points of the medium-exposure image and the long-exposure image at the pixel point position into the pixel point of the HDR image at the same pixel point position according to the medium-exposure weight coefficient and the long-exposure weight coefficient;

discard the medium-exposure image and the long-exposure image when the motion state is the moving pixel and the image brightness type is the low-light image; and weight and synthesize the pixel points of the short-exposure image at the pixel point position into the pixel point of the HDR image at the same pixel point position according to the short-exposure weight coefficient.

17. An aerial camera, comprising:

an image sensor, configured to capture a plurality of images with set shooting parameters;

a controller, connected to the image sensor and configured to trigger the image sensor to capture the plurality of images with different exposure time; and an image processor, configured to receive the plurality of images captured by the image sensor through continuous exposure and perform the following operations for the received plurality of images:

acquiring a plurality of to-be-synthesized images, wherein each of the to-be-synthesized images has a different exposure time;

calculating a mean brightness of the to-be-synthesized images;

determining an image brightness type of the to-be-synthesized images according to the mean brightness;

calculating a brightness difference between adjacent pixel points in one to-be-synthesized image;

calculating an inter-frame difference of different to-be-synthesized images at a same pixel point position according to the brightness difference;

determining a motion state of the to-be-synthesized images at the pixel point position according to the inter-frame difference; and weighting and synthesizing the to-be-synthesized images into a corresponding HDR image according to the image brightness type and the motion state.

18. The aerial camera according to claim 17, wherein the image brightness type comprises a high-light image and a low-light image; and the image processor is further configured to:

determine that the to-be-synthesized image is the high-light image when the mean brightness is greater than or equal to a preset brightness detection threshold; and determine that the to-be-synthesized image is the low-light image when the mean brightness is less than the brightness detection threshold.

19. The aerial camera according to claim 17, wherein the image processor is further configured to:

superimpose brightness values of all pixel points in the to-be-synthesized image to obtain an accumulated brightness value;

sum the accumulated brightness values of all of the to-be-synthesized images to obtain a total brightness value; and calculate the mean brightness value according to the total brightness value, a quantity of the to-be-synthesized images and sizes of the to-be-synthesized images.

20. The aerial camera according to claim 17, wherein the motion state comprises a moving pixel and a stationary pixel; and the image processor is further configured to:

determine whether an inter-frame difference between the short-exposure image and the medium-exposure image and an inter-frame difference between the medium-exposure image and the long-exposure image are both less than a preset motion detection threshold;

determine that the motion state at the pixel point position is the stationary pixel when the inter-frame difference between the short-exposure image and the medium-exposure image and an inter-frame difference between the medium-exposure image and the long-exposure image are both less than a preset motion detection threshold; and determine that the motion state at the pixel point position is the moving pixel when the inter-frame difference between the short-exposure image and the medium-exposure image and an inter-frame difference between the medium-exposure image and the long-exposure image are more than a preset motion detection threshold.

* * * * *